(12) United States Patent
Hu et al.

(10) Patent No.: US 11,138,514 B2
(45) Date of Patent: Oct. 5, 2021

(54) REVIEW MACHINE LEARNING SYSTEM

(71) Applicant: Futurewei Technologies, Inc., Plano, TX (US)

(72) Inventors: Luhui Hu, Bellevue, WA (US); Hui Zang, Santa Clara, CA (US); Ziang Hu, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 776 days.

(21) Appl. No.: 15/467,847

(22) Filed: Mar. 23, 2017

(65) Prior Publication Data

US 2018/0276560 A1   Sep. 27, 2018

(51) Int. Cl.
*G06N 20/00* (2019.01)

(52) U.S. Cl.
CPC ................... *G06N 20/00* (2019.01)

(58) Field of Classification Search
CPC ...................................... G06N 20/00
See application file for complete search history.

(56) References Cited

U.S. PATENT DOCUMENTS

| 9,454,733 | B1 | 9/2016 | Purpura et al. | |
| 2008/0103996 | A1* | 5/2008 | Forman | G06N 20/00 706/12 |
| 2016/0285805 | A1* | 9/2016 | Oliver | H04L 51/12 |
| 2017/0017901 | A1 | 1/2017 | Firooz et al. | |
| 2017/0227995 | A1* | 8/2017 | Lee | G06F 1/1694 |
| 2018/0097744 | A1 | 4/2018 | Hu et al. | |
| 2018/0255122 | A1 | 9/2018 | Hu et al. | |
| 2018/0285764 | A1 | 10/2018 | Hu et al. | |

FOREIGN PATENT DOCUMENTS

| CN | 102637172 A | 8/2012 |
| CN | 104915420 A | 9/2015 |

OTHER PUBLICATIONS

DeBarr et al., "Spam Detection using Clustering, Random Forests, and Active Learning", Jul. 16-17, 2009, CEAS 2009—Sixth Conference on Email and Anti-Spam, pp. 1-3 (Year: 2009).*
Kandaswamy et al., "Improving Deep Neural Network Performance by Reusing Features Trained with Transductive Transference", 2014, ICANN 2014: Artificial Neural Networks and Machine Learning—ICANN 2014, pp. 265-272 (Year: 2014).*

(Continued)

*Primary Examiner* — Kamran Afshar
*Assistant Examiner* — Brent Johnston Hoover
(74) *Attorney, Agent, or Firm* — Schwegman Lundberg & Woessner, P.A.

(57) ABSTRACT

An apparatus and method are provided for review-based machine learning. Included are a non-transitory memory storing instructions and one or more processors in communication with the non-transitory memory. The one or more processors execute the instructions to receive first data, generate a plurality of first features based on the first data, and identify a first set of labels for the first data. A first model is trained using the first features and the first set of labels. The first model is reviewed to generate a second model, by receiving a second set of labels for the first data, and reusing the first features with the second set of labels in connection with training the second model.

18 Claims, 9 Drawing Sheets

(56) References Cited

OTHER PUBLICATIONS

Kandaswamy et al., "Improving Deep Neural Network Performance by Reusing Features Trained with Transductive Transference", 2014, ICANN 2014: Artificial Neural Networks and Machine Learning—ICANN 2014, pp. 1-8 (Year: 2014).*
"International Application No. PCT/CN2018/079362, International Search Report and Written Opinion dated May 30, 2018", (May 30, 2018), 9 pgs.

* cited by examiner

REVIEW MACHINE LEARNING SYSTEM

FIELD OF THE INVENTION

The present disclosure relates to machine learning, and more particularly to review-based machine learning.

BACKGROUND

Machine learning is a type of artificial intelligence (AI) that provides computing systems with the ability to learn without being explicitly programmed. Machine learning focuses on the development of computer programs that can change when exposed to new data. Over the past few years, machine learning has dominated approaches to solving many important problems in computing such as speech recognition, machine translation, handwriting recognition and many computer vision problems such as face, object and scene recognition. More recently, cognitive learning operates based on learning and knowledge transfer learning. Existing machine learning techniques include transfer learning, ensemble learning, incremental learning, and reinforcement learning. Accuracy of a learning system depends on the training of the learning system and training requires large amounts of raw data. Preparing the raw data for training is computationally intensive and preparing the large amounts of raw data required for training a model is time consuming. The trained model is applied to input data to generate results and the trained model is evaluated by monitoring errors during operation. If the errors increase above a threshold, the model is retrained using a large quantity of new raw data. However, before the model can be retrained, the large quantity of new raw data must be prepared, resulting in a large delay. It is desirable to retrain a model without incurring a large delay.

SUMMARY

According to one aspect of the present disclosure, there is provided an apparatus for review-based machine learning. Included are a non-transitory memory storing instructions and one or more processors in communication with the non-transitory memory. The one or more processors execute the instructions to receive first data, generate a plurality of first features based on the first data, and identify a first set of labels for the first data. A first model is trained using the first features and the first set of labels. The first model is reviewed to generate a second model, by receiving a second set of labels for the first data, and reusing the first features with the second set of labels in connection with training the second model.

According to one aspect of the present disclosure, there is provided a method comprising receiving first data, generating a plurality of first features based on the first data, and identifying a first set of labels for the first data. A first model is trained using the first features and the first set of labels. The first model is reviewed to generate a second model, by receiving a second set of labels for the first data, and reusing the first features with the second set of labels in connection with training the second model.

According to one aspect of the present disclosure, there is provided a non-transitory computer-readable media storing computer instructions. When the computer instructions are executed by one or more processors, the one or more processors perform the steps of receiving first data, generating a plurality of first features based on the first data, and identifying a first set of labels for the first data. A first model is trained using the first features and the first set of labels. The first model is reviewed to generate a second model, by receiving a second set of labels for the first data, and reusing the first features with the second set of labels in connection with training the second model.

Optionally, in any of the preceding aspects, the first data is received during a first time period, and second data is received during a second time period after the first time period.

Optionally, in any of the preceding aspects, the one or more processors execute the instructions to determine whether a trigger has occurred, where the second model is conditionally generated based on the determination. Optionally, the determination whether the trigger has occurred includes determining whether a timer has expired. Optionally, the determination whether the trigger has occurred includes determining whether a count of the labels in the second set of labels has exceeded a threshold. Optionally, the determination whether the trigger has occurred includes determining whether an error value in connection with a performance of the first model has exceeded a threshold.

Optionally, in any of the preceding aspects, a generation of second features based on the second set of labels is avoided, by reusing at least a portion of the first features in connection with the generation of the second model.

Optionally, in any of the preceding aspects, the second model is generated, utilizing second features generated based on the second set of labels in addition to at least a portion of the first features.

Optionally, in any of the preceding aspects, the second set of labels replaces the first set of labels.

Optionally, in any of the preceding aspects, the one or more processors execute the instructions to maintain model metadata by recording properties for the first model and the second model, the properties including a name, a portion of the first features selected for training, an algorithm, or a set of labels.

Optionally, in any of the preceding aspects, the one or more processors execute the instructions to maintain review metadata by recording properties for the first model and the second model, the properties including one or more of accuracy, a trigger event for each new model generation, a label, a time stamp, or a model name.

Optionally, in any of the preceding aspects, the one or more processors execute the instructions to store a feature and label table in a memory, the feature and label table including the first features and the first set of labels for the first data. Optionally, the one or more processors execute the instructions to update the feature and label table in a memory to include the second set of labels for the first data.

Optionally, in any of the preceding aspects, a first portion of the first features is used to train the first model and a second portion of the first features that comprises a subset of the first portion is used to train the second model.

Optionally, in any of the preceding aspects, a first portion of the first features is used to train the first model and the first portion of the first features is used to train the second model.

To this end, in some optional aspects, one or more of the foregoing features of the aforementioned apparatus, system and/or method may improve accuracy of a model and/or reduce the time used to retrain a model when new data is received by reusing at least one of data or features that are generated from the data.

It should be noted that the aforementioned potential advantages are set forth for illustrative purposes only and should not be construed as limiting in any manner.

DETAILED DESCRIPTION

Development of a machine learning model is typically costly in terms of time and requires large amounts of data, particularly a training dataset. A data scientist's expertise may be used to develop the training dataset, select features (variables), select an algorithm, configure the machine learning model, and tune the machine learning model. The training dataset includes input data and output data that are results (i.e., predictions) that the machine learning model should generate in response to the input data. Machine learning models are used in many different applications, some of which include fraud detection, health diagnosis, purchase recommendations, and traffic navigation. The input data may include values for a variety of different attributes and a set of features is identified that are most relevant to generate the correct predictions for the problem being solved or question being answered by the machine learning model. The input data is generated by processing raw data to remove faulty data, incorrect results, redundant data, etc.

In the context of the following description a label is a result or prediction that is included as the output data of a training dataset. Examples of labels for a health diagnosis application of a machine learning model may include healthy, sick, and more specific labels such as malaria, yellow fever, etc. The model generates a value for one or more labels and the value may be true/false or a probability (percentage). During training, the predictions generated by the model may be compared with the label values in the training dataset to measure accuracy of the model. The training dataset is referred to as "labeled data" because correct predictions are provided as label values along with the input data. When a desired accuracy is achieved, the model may be deployed to generate predictions for unlabeled input data.

A review-based machine learning system is a big data oriented platform that enhances machine learning models by reusing existing features to generate new learning models rather than generating new features when new raw data is available. The computationally intensive and time-consuming tasks of preparing new raw data to retrain the machine learning model are avoided by reusing the existing features. New labels associated with the existing raw data are used with the existing features and existing data to train the new model and improve accuracy. In contrast, conventional techniques first prepare new raw data and then perform feature engineering using the prepared new data. After feature engineering is completed, new features are selected and the model can be retrained using the prepared new data and the new features.

The review-based learning approach mimics the human learning mechanism—cognitive learning through acquisition of both new information and reviewing existing information. In human beings, review-based learning accomplishes two objectives: reminding the human of what may have been forgotten and systematizing and inducing what has been learned. When implemented in a system, review-based learning enables systematization and induction of the learning models and utilization of accumulated data to predict new learning models or systems.

Figure 1:
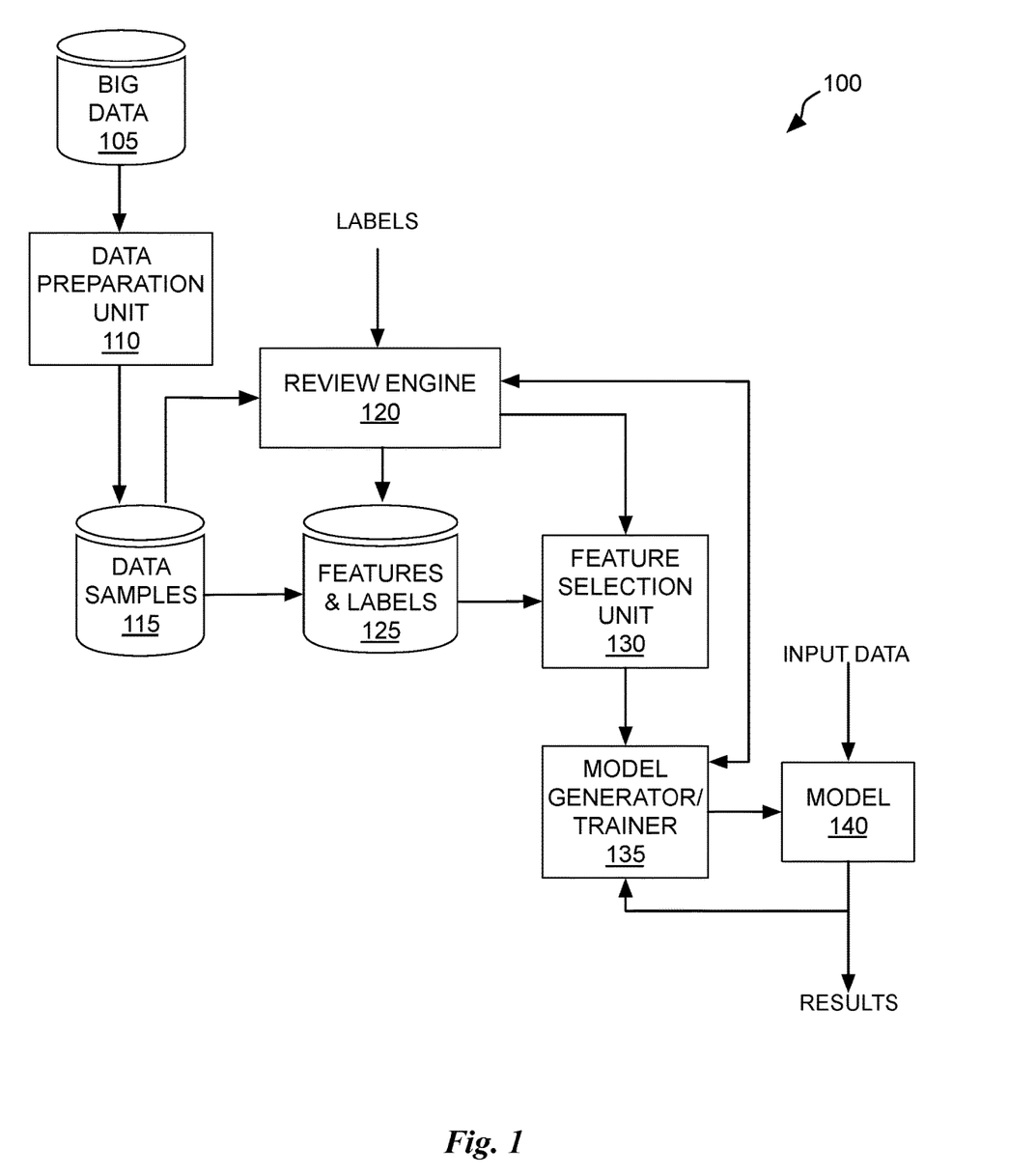
FIG. 1 illustrates a review-based learning system, in accordance with one embodiment.

FIG. 1 illustrates a review-based learning system 100, in accordance with an embodiment. As shown, the system 100 includes a big data storage 105, a data preparation unit 110, a review engine 120, a features & labels storage 125, a feature selection unit 130, a model generator/trainer 135, and a model 140. It should be noted that the communication between the foregoing components of the review-based learning system 100 may be afforded by way of any type of networking (e.g. bus networks, local networks, remote networks, etc.). As an option, the review-based learning system 100 may be implemented with one or more features of any one or more of the embodiments set forth in any subsequent figure(s) and/or the description thereof. However, it is to be appreciated that the review-based learning system 100 may be implemented in the other suitable environments.

Further, while the various components are shown to be separate and discrete in one possible embodiment, other optional embodiments are contemplated where one or more (or even all) are integrated. To this end, each of the illustrated components of the review-based learning system 100 may include any combination of software and/or hardware capable of performing their intended tasks that will be elaborated upon below, and may or may not share underlying hardware with one or more of the other components of the review-based learning system 100. The illustrated components can communicate with each other using one or more data communication networks such as, for example, the Internet. More information will now be set forth regarding each of the foregoing components and the interoperability thereof.

As shown, raw data is stored in a data storage means in the form of the big data storage 105 and is prepared by a data preparation means, in the form of the data preparation unit 110. In one embodiment, the raw data may correspond to one or more specific time periods. Additional new raw data corresponding to subsequent time periods may be received and stored in the big data storage 105. In various embodiments, the data preparation unit 110 may include, but is not limited to at least one processor and any software controlling the same, and/or any other circuitry capable of the aforementioned functionality. Examples of raw data sets for a health diagnosis application of a machine learning model may include a patient's blood pressure, temperature, white blood cell count, etc. Examples of raw data for a telecom fraud application of a machine learning model may include data for each telecom customer such as call timestamps, call locations, international minutes, outgoing call minutes, incoming call minutes, the digits dialed, etc.

The data preparation unit 110 may perform cleansing and formatting of the raw data to produce prepared data that are stored in a storage means in the form of the data samples storage 115. Examples of prepared data may include credit card transactions for consumers, voter/constituent data related to political events, telecom usage for users, etc. Prepared data for credit card transactions and telecom usage may be used to detect fraud. Cleansing of the raw data may include removing faulty data, incorrect results, redundant data, etc. Formatting of the raw data may include converting data represented in different formats (decimal, fraction, floating-point, Celsius, Fahrenheit, etc.) into a common format.

The prepared data are processed by a review means in the form of the review engine 120 to generate features that are stored in a storage means in the form of the features & labels storage 125. In various embodiments, the review engine 120 may include, but is not limited to at least one processor and any software controlling the same, and/or any other circuitry capable of the aforementioned functionality. Examples of features generated from the prepared data of credit card transactions that may be used to detect fraud may include: a charge for one dollar, a charge in a city far from where the customer lives, a foreign transaction, a cash withdrawal from an ATM (automated teller machine), repeated errors entering PIN (personal identification number), etc. Examples of labels for the prepared data may include suspicious activity, credit card fraud, stolen credit card, etc.

When the model or classifier 140 is being trained, labels are used to measure the accuracy of the model 140. In one embodiment, the labels are included with the raw data and are extracted from the raw data. In another embodiment, the labels are received separately and are linked to the raw data. An example of a label is "fraud". In one embodiment, the labels are survey data that is gathered for at least a subset of the individuals (e.g. samples) corresponding to the raw data. After the model 140 is trained, the model 140 is deployed, the model 140 generates results in response to input data. The results are predicted labels that are generated based on the training.

After generating the features for the prepared data, a feature selector means in the form of the feature selection unit 130 selects at least a portion of the features for use by a model generator/trainer means in the form of the model generator/trainer 135. In one embodiment, the features are selected using a decision tree. In one embodiment, the selected features are the features that contribute more significantly to a result compared with other features. In various embodiments, the selection unit 130 may include, but is not limited to at least one processor (to be described later) and any software controlling the same, and/or any other circuitry capable of the aforementioned functionality. In various embodiments, the model generator/trainer 135 may include, but is not limited to at least one processor (to be described later) and any software controlling the same, and/or any other circuitry capable of the aforementioned functionality.

The model generator/trainer 135 determines an algorithm to be used by the model 140 and trains the model 140. Example classification algorithms include logistic regression, linear regression, decision tree, support vector machine (SVM), k-nearest neighbors (KNN), Naïve Bayes, deep neural network (DNN), convolutional neural network (CNN), recurrent neural network (RNN), and random forest. Other suitable training algorithms are possible. The model 140 is trained using the features and labels stored in the features & labels 125. In one embodiment, the model 140 is a neural network. The labels are used by the model generator/trainer 135 for training the model 140. In particular, the labels are compared with predictions produced when the model 140 is applied to the prepared data. A first portion of the prepared data and associated labels may be used by the model 140 as a training dataset to train the model 140 and a second portion of the prepared data and associated labels may be used as a validation dataset to measure the accuracy of the model. The prepared data and associated labels included in each portion may change for different training iterations until a desired level of accuracy is achieved. In one embodiment, the entire prepared data and associated labels may be used as a validation dataset to measure the accuracy of the model 140. Typically, the size of the validation dataset is much smaller than the training dataset because the amount of data needed to measure the performance of the model 140 is much less than the amount of data that is needed to train the model 140.

The model 140 performs a classification operation by mapping a combination of the features to a particular label. During training, the model adapts and evolves to learn the correct labels (provided in the training dataset) for the training input data. In one embodiment, the model 140 is a mathematical function corresponding to the label "fraud". In one embodiment, the mathematical function is a linear function in the form $y=K+Ax_1+Bx_2+Cx_3 \ldots Zx_N$, where K is a constant, A, B, C, and Z are coefficients, $x_1$, $x_2$, $x_3$, and $x_N$ are features, and y is a label. The values of the coefficients A, B, C, . . . and Z are greater for features that are more significant or relevant and therefore, contribute more to the result (e.g., label) than other features. During feature selection, the feature selection unit 130 may select a portion of the features that are associated with coefficients greater than a threshold value as the selected features.

When the model 140 is sufficiently trained to accurately produce results that match the labels, training is complete and the model 140 may be deployed. When the model 140 is deployed, input data is received and the model 140 is applied to produce results. In contrast with the training dataset, the input data does not include labels corresponding to the input data. Instead, the labels associated with the input data are received at a later time. For example, a survey completed by one or more individuals corresponding to the input data may provide the labels or a fraud investigation unit within a credit card company may provide the labels. During deployment, the model 140 is applied to generate results that are probable based on the training, i.e., predictions.

When the model 140 is deployed, the model generator/trainer 135 may apply one or more validation datasets to the model 140 to monitor performance and accuracy of the model 140 (i.e., review the model 140). In one embodiment, the review engine 120 initiates generation of a new model 140 when the model's accuracy in predicting the correct answer does not satisfy a threshold (e.g., a threshold number of the results generated by the model 140 do not match the corresponding labels for the input data). In other words, when a threshold number of errors are detected during operation of the model 140, the review engine 120 initiates generation of the new model 140. For example, in one embodiment, when the accuracy of the results falls below 80%, the review engine 120 may initiate generation of the new model 140. In one embodiment, the review engine 120 initiates generation of the new model 140 when a predetermined time duration has elapsed since the last model 140 was generated. In one embodiment, the review engine 120 initiates retraining of the model 140 when a threshold number of new labels are received that are associated with old input data (i.e., previously received input data).

In contrast with a conventional learning system, when new raw data is received, the review engine 120 within the review-based learning system 100 does not necessarily immediately prepare the new raw data to retrain the model 140. Instead, new labels that are received are inserted into a feature and label table. In one embodiment, new labels are extracted from information contained in the new raw data and the new labels are matched to the existing training tuples in the training dataset.

Figure 2A:
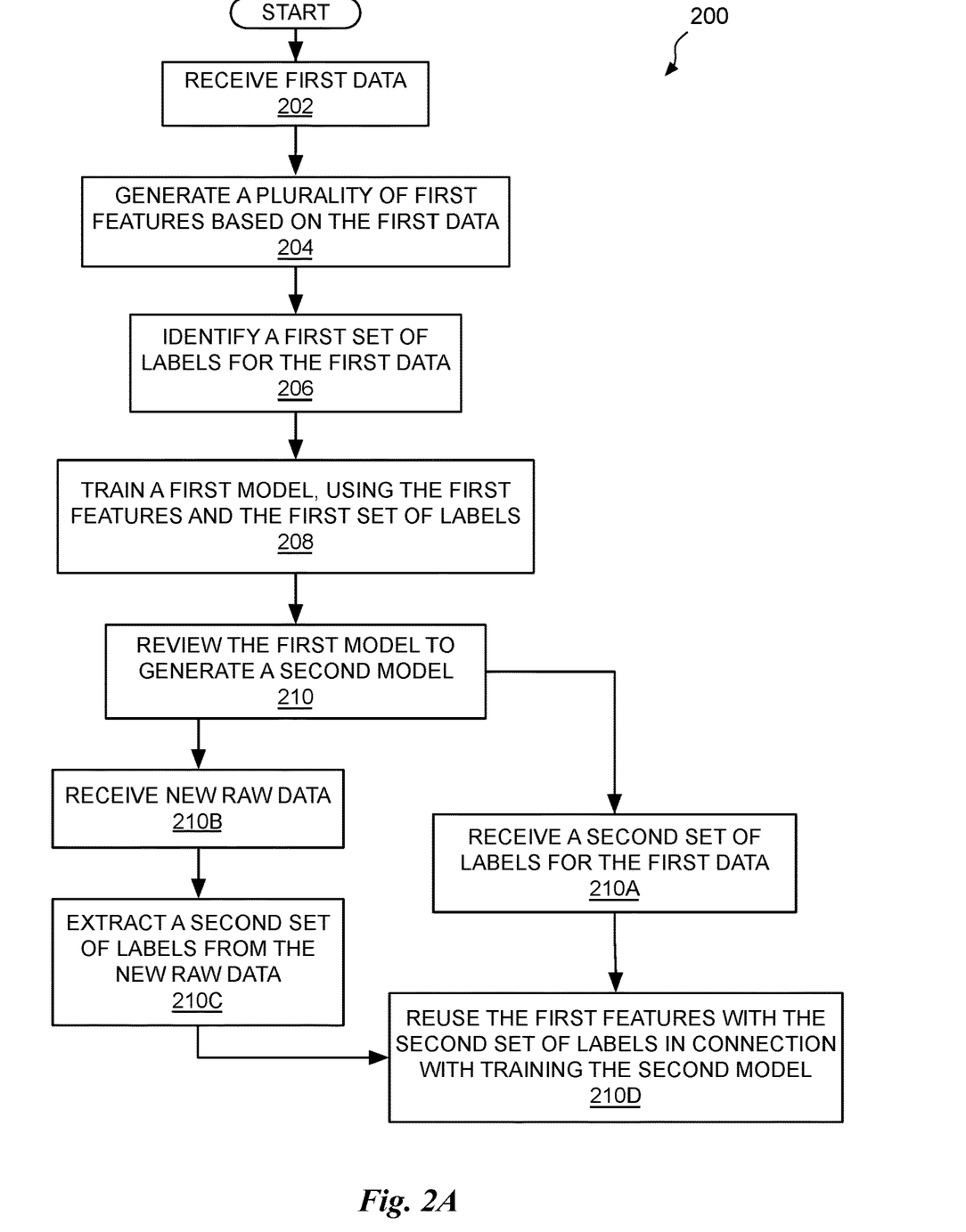
FIG. 2A illustrates a method for review-based learning, in accordance with one embodiment.
Figure 2B:
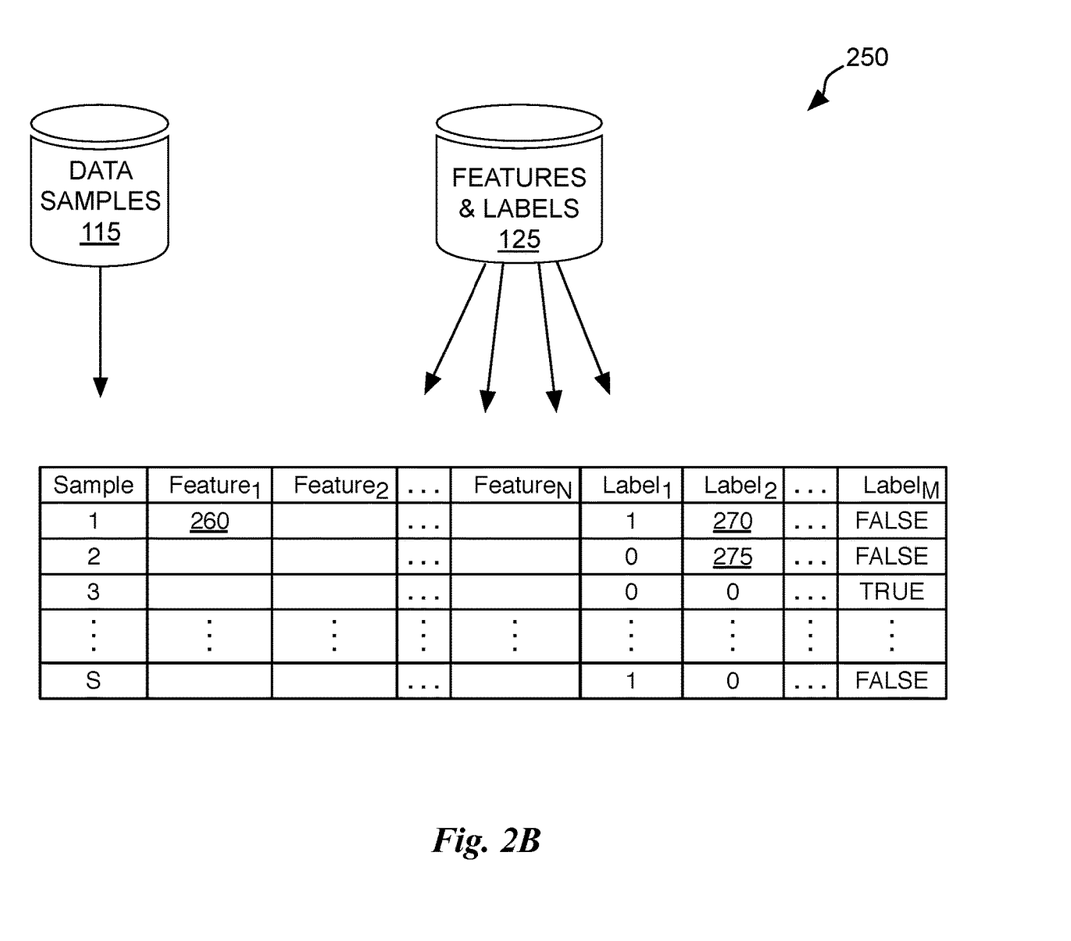
FIG. 2B illustrates a feature and label table for review-based learning, in accordance with one embodiment.

The feature and label table may be stored in the features & labels storage 125 and is described in conjunction with FIG. 2B. The new labels may be associated with old input data. The new labels may be received with new raw data. In one embodiment, input data may be used as training data once the labels associated with the new input data are received.

However, in one embodiment, when new raw data and/or new labels are received, the new model 140 is generated without preparing the new raw data to generate the new model 140. Instead, the existing features are used with the new labels and the feature and label table 150 is updated accordingly. In one embodiment, a first portion of the N features are selected features that are used to train the existing model 140 and a second portion of the N features are selected features that are used to train the new model 140. The second portion may be the same as the first portion, the second portion may include a subset of the first portion, or the first and second portions may be exclusive (i.e., no feature included in the first portion is also included in the second portion).

One or more functions associated with the existing labels may be replaced or modified. The algorithm selected for the model 140 may be replaced or modified. The new model 140 is then trained using the existing prepared data, new labels, and selected features (i.e., the second portion of the N features). In contrast, a conventional learning system retrains the existing model using the new raw data, after first preparing the new raw data and engineering features for the new raw data—thereby delaying the retraining.

More illustrative information will now be set forth regarding various optional architectures and uses in which the foregoing technique may or may not be implemented, in accordance with other embodiments. It should be strongly noted that the following information is set forth for illustrative purposes and should not be construed as limiting in any manner. Any of the following features may be optionally incorporated with or without other features described.

Recently, deep learning has dominated the approaches to solving many important problems in computing such as speech recognition, machine translation, handwriting recognition and many computer vision problems such as face, object and scene recognition. Deep learning has been applied to cognitive learning to predict learning based on learning and knowledge transfer learning. However, massive quantities of raw data are needed to train the neural networks that implement the deep learning systems.

The review-based learning system 100 is a big data oriented platform to enhance the learning model mainly through reviewing the model 140 and generating a new model 140 using existing prepared data and existing features. In addition, the review-based learning system 100 may utilize the new raw data to train the new model 140, as labels associated with the new raw data are available. In one embodiment, the review-based learning system 100 may engineer new features, as the new raw data is available. In contrast, conventional learning systems discard the existing prepared data and generate new prepared data from the new raw data to retrain the model. The conventional learning systems also discard the existing features and generate new features for the new prepared data.

FIG. 2A illustrates a method 200 for review-based learning, in accordance with one embodiment. As an option, the method 200 may be implemented in the context of any one or more of the embodiments set forth in any previous and/or subsequent figure(s) and/or the description thereof. For example, in one possible embodiment, the method 200 may be implemented in the context of the review-based learning system 100 of FIG. 1. However, it is to be appreciated that the method 200 may be implemented in other suitable environments.

As shown, in operation 202, first data is received by the review-based learning system 100. In one embodiment, the first data is raw data that is stored in the big data storage 105. In one embodiment, the first data is prepared by the data preparation unit 110 and stored in the data samples storage 115. In one embodiment, the review engine 120 performs feature engineering on the prepared first data and stores features and labels that are associated with the prepared first data in the features & labels storage 125.

In operation 204, the review engine 120 generates a plurality of first features based on the first data. In one embodiment, a first portion of features are selected from the first features by the feature selection unit 130. In operation 206, the review engine 120 identifies a first set of labels for the first data. The first set of labels may be included in the labels that are stored in the features & labels storage 125. In operation 208, the model generator/trainer 135 trains a first model 140 using the first features and the first set of labels. In one embodiment, the model generator/trainer 135 trains the first model 140 using the prepared first data, the first features, and the first set of labels. After training, the first model 140 may be deployed. In operation 210, the model generator/trainer 135 reviews the first model 140 to generate a second model 140.

In one embodiment, the second model replaces the first model 140. In one embodiment, generation of the second model 140 is initiated by the review engine 120 in response to a trigger. The trigger may include at least one of expiration of a timer, receiving new raw data, receiving new labels, determining a threshold number of new labels are received, determining a threshold error value is reached, or determining a threshold number of errors are detected during deployment of the first model 140.

In one embodiment, the operation 210, includes the operations 210A, 210B, 210C, and 210D. In operation 210A, the review-based learning system 100 receives a second set of labels associated with the first data. In one embodiment, the review-based learning system 100 also receives second data that is raw data and is stored in the big data storage 105. In one embodiment, the second data is used as input data. In one embodiment, the second set of labels is received after the first data. The second set of labels may be linked with the first data and stored in the features & labels storage 125. In one embodiment, the second set of labels is received by the review-based learning system 100 after the first model 140 is trained (i.e., after operation 210). Information for matching the second set of labels to the first data is provided along with the second set of labels.

Rather than receiving the second set of labels directly, in operation 210B, the review-based learning system 100 receives new raw data. In operation 210C, the review-based learning system 100 extracts a second set of labels from information included in the new raw data and matches the second set of labels to the first data. In operation 210D, the model generator/trainer 135 generates the second model 140. Importantly, the model generator/trainer 135 reuses the first features with the second set of labels in connection with training the second model 140. In one embodiment, the model generator/trainer 135 may select a different algorithm for the second model 140 than was selected for the first model 140. In contrast with conventional learning systems, the review-based learning system 100 does not require preparation of additional raw data and generation of second features to train the second model 140.

In one embodiment, the first data is associated with a first time period (e.g., hours, days, months, etc.) and second data is associated with a second time period that is later compared with the first time period. In one embodiment, at least a portion of the second data is prepared by the data preparation 110 and features are engineered by the features selection 130 using the second data. A combination of the prepared second data and second features and the first prepared data and first features may be used by the model generator/trainer 135 to train the second model 140. In one embodiment, the data that is used to generate the features corresponds to a time period having a fixed duration so that a portion of new raw data that is received is prepared and combined with a portion of the existing prepared data to generate the selected features and labels. The fixed duration time period effectively implements a window of time that moves each time the model 140 is reviewed and a new model 140 is trained. The window of time determines the portions of the prepared new data and existing data and portions of the new features and existing features that are used to train the new model 140.

New labels that are received by the review engine 120 may correspond to new raw data that was received earlier. For example, new raw data comprising telecom data for a set of users for October-December may be received by the review-based learning system 100 and stored in the big data storage 105. The raw data may include data for each one of the users in the set of users such as call timestamps, call locations, international minutes, outgoing call minutes, incoming call minutes, the digits dialed, etc. The model 140 may be trained to detect fraud, and, when the model 140 is applied to the raw data (input data), the model 140 may generate results indicating whether or not fraud is detected for each of the users. Features may be extracted from the raw data and provided as input data to the model 140. For example, the features may include the total call minutes, amount of data downloaded, locations of incoming calls, locations of outgoing calls, users called, etc.

Some time after the model is applied to the new raw data for the October-December time period, new raw data for the January-March time period is received by the review-based learning system 100. New labels associated with the October-December raw data may be received after the October-December raw data is received and before the January-March raw data is received, along with the January-March raw data, or after the January-March raw data is received. When the labels associated with the October-December raw data are received by the review engine 120, the features extracted from the October-December raw data may be used by the model generator/trainer 135 along with the associated labels to review the model 140 and generate a new model 140.

FIG. 2B illustrates a feature and label table 250 for review-based learning, in accordance with one embodiment. The feature and label table 250 may be stored in the features & labels storage 125. The feature and label table 250 includes references (e.g., 1, 2, 3, . . . S) to sample sets within the prepared data that is stored in the data samples storage 115. In the context of the following description, the reference may be a pointer, address, index, etc. In one embodiment, the sample set may correspond to one or more individuals. Each of the N features engineered based on the prepared data may be relevant for one or more of the sample sets. A portion of the N features in the feature and label table 250 are included in the selected features for the model 140. Importantly, the N features are stored in the feature and label table 250 and a different portion of the N features may be selected during each review of the model 140 to generate a new model 140. New features may be added to the feature and label table 250 when new raw data is prepared by the data preparation unit 110.

For example, when the model 140 is trained to identify different types of fruit, each one of the sample identifiers in the feature and label table 250 corresponds to a different type of fruit (e.g., oranges, apples, pears, etc.). Examples of the features (Feature$_1$, Feature$_2$, . . . Feature$_N$) may include color (red, yellow, blue, etc.), shape, weight, etc. Values stored in the feature and label table 250 for the features may be represented in an integer, float-point, or binary format, or the value may be encoded in any other manner suitable to represent a number. Values stored in the feature and label table 250 for the features may be categorical identifiers. For example, a value 260 stored for the Feature$_1$ may be 8.5 when Feature$_1$ is weight. In one embodiment, the value 260 may represent a categorical identifier, such as red, green, blue, etc. when the Feature$_1$ is color or sphere, cube, oblong, etc. when the Feature$_1$ is a shape.

When the model 140 is trained to identify different types of fruit, the labels (Label$_1$, Label$_2$, . . . Label$_M$) may include "orange", "apple", "pear", etc. Values stored in the feature and label table 250 for the labels may be represented in an integer, float-point, or binary format, or the value may be encoded in any other manner suitable to represent a number. As shown in FIG. 2B, the values for Label$_1$ are encoded in a binary format and the values for Label$_M$ are encoded as True/False. Values 270 and 275 for Label$_2$ represent a probability 0-100%.

New labels may be added to the feature and label table 250 by the review engine 120 when new labels are received by the review engine 120. For example, labels associated with the October-December raw data are stored in the feature and label table 250 as Label$_1$ through Label$_{10}$ and the labels associated with the January-March raw data are stored in the feature and label table 250 as Label$_{11}$ through Label$_{20}$.

Figure 3:
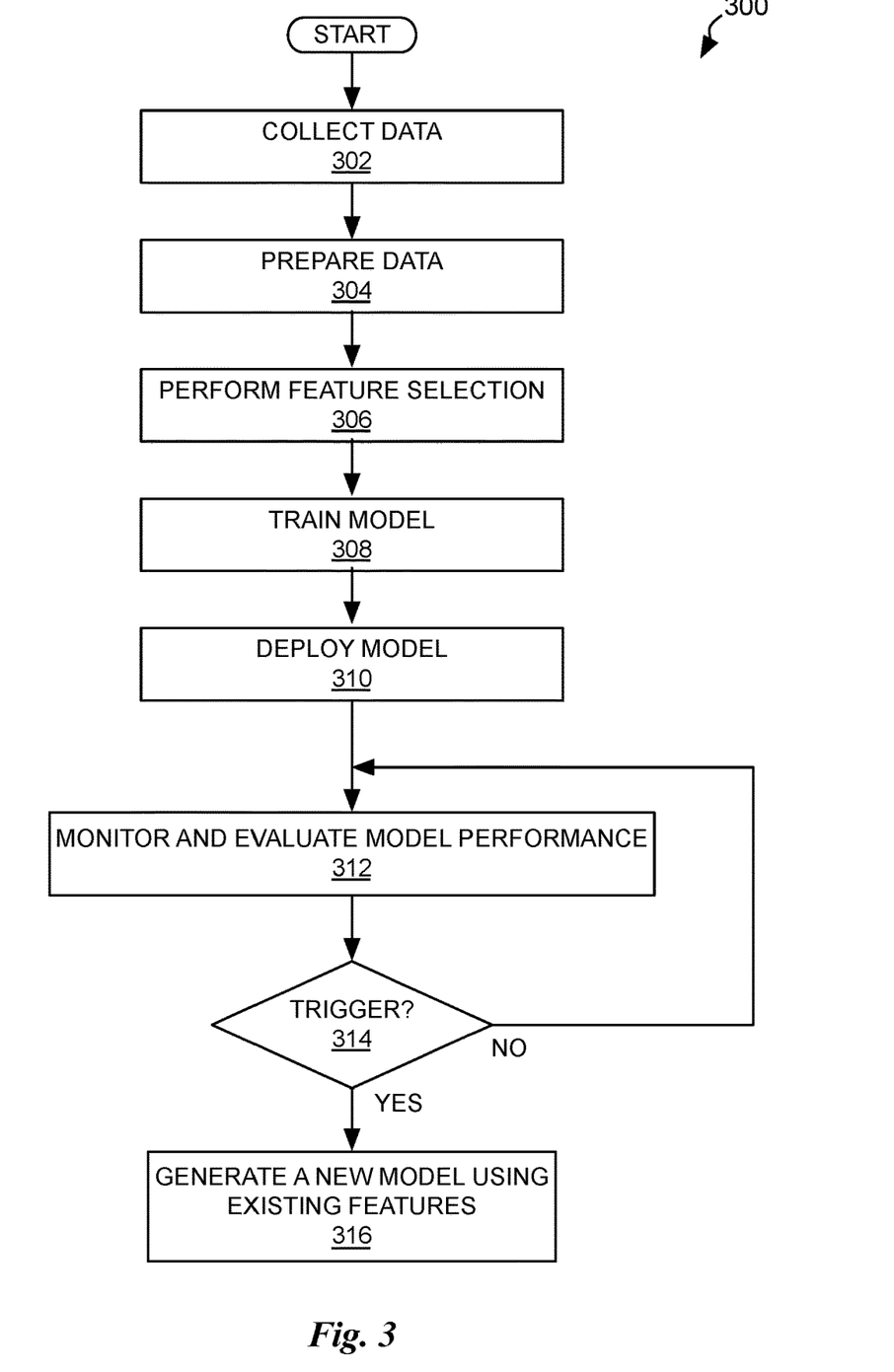
FIG. 3 illustrates a method for generating a new model using review-based learning, in accordance with one embodiment.

FIG. 3 illustrates a method 300 for generating a new model using review-based learning, in accordance with one embodiment. As an option, the method 300 may be implemented in the context of any one or more of the embodiments set forth in any previous and/or subsequent figure(s) and/or the description thereof. For example, in one possible embodiment, the method 300 may be implemented in the context of the review-based learning system 100 of FIG. 1. However, it is to be appreciated that the method 300 may be implemented in other suitable environments.

As shown, in operation 302, data is collected by the review-based learning system 100. In one embodiment, the data is raw data that is stored in the big data storage 105. In operation 304, the data is prepared by the data preparation unit 110 and stored in the data samples storage 115. In one embodiment, the review engine 120 performs feature engineering on the prepared data and stores features that are associated with the prepared data in the feature and label table 250. Labels associated with the prepared data are also stored in the feature and label table 250.

In operation 306, the feature selection unit 130 selects at least a portion of the features stored in the features & labels storage 125 as selected features. In operation 308, the model generator/trainer 135 trains the model 140. In one embodiment, the generator/trainer 135 trains the model 140 using the prepared data, labels, and selected features. The prepared data, labels, and selected features used to train the model 140 in operation 308 are referred to as existing prepared data, existing labels, and existing selected features compared with new data, new features, and new labels that are received or generated after the model 140 is initially trained.

In operation 310, the model 140 is deployed and is applied to input data to produce results. In one embodiment, the results are predictions that are generated by the model 140 in response to the input data. The results may be compared with associated labels by the review engine 120 and errors may be counted to produce an error value indicating the accuracy of the model 140. In operation 312, the review engine 120 monitors and evaluates performance of the model 140. Further details of the operation 312 are described in conjunction with FIG. 4.

In operation 314, the review engine 120 determines if a trigger has occurred, and if not, the review engine 120 returns to step 312. The trigger may include at least one of expiration of a timer, receiving new raw data, receiving new labels, determining a threshold number of new labels are received, determining a threshold error value is exceeded during deployment of the first model 140. Otherwise, if a trigger has occurred in operation 316, the model generator/trainer 135 generates a new model 140 using the existing features. In one embodiment, in operation 316, the model generator/trainer 135 trains the new model 140 using the same existing features that were selected during the operation 306. In one embodiment, in operation 316, the model generator/trainer 135 trains the new model 140 using a different portion of the existing features compared with the features selected during the operation 306. Further details of the operation 316 are described in conjunction with FIG. 5.

Figure 4:
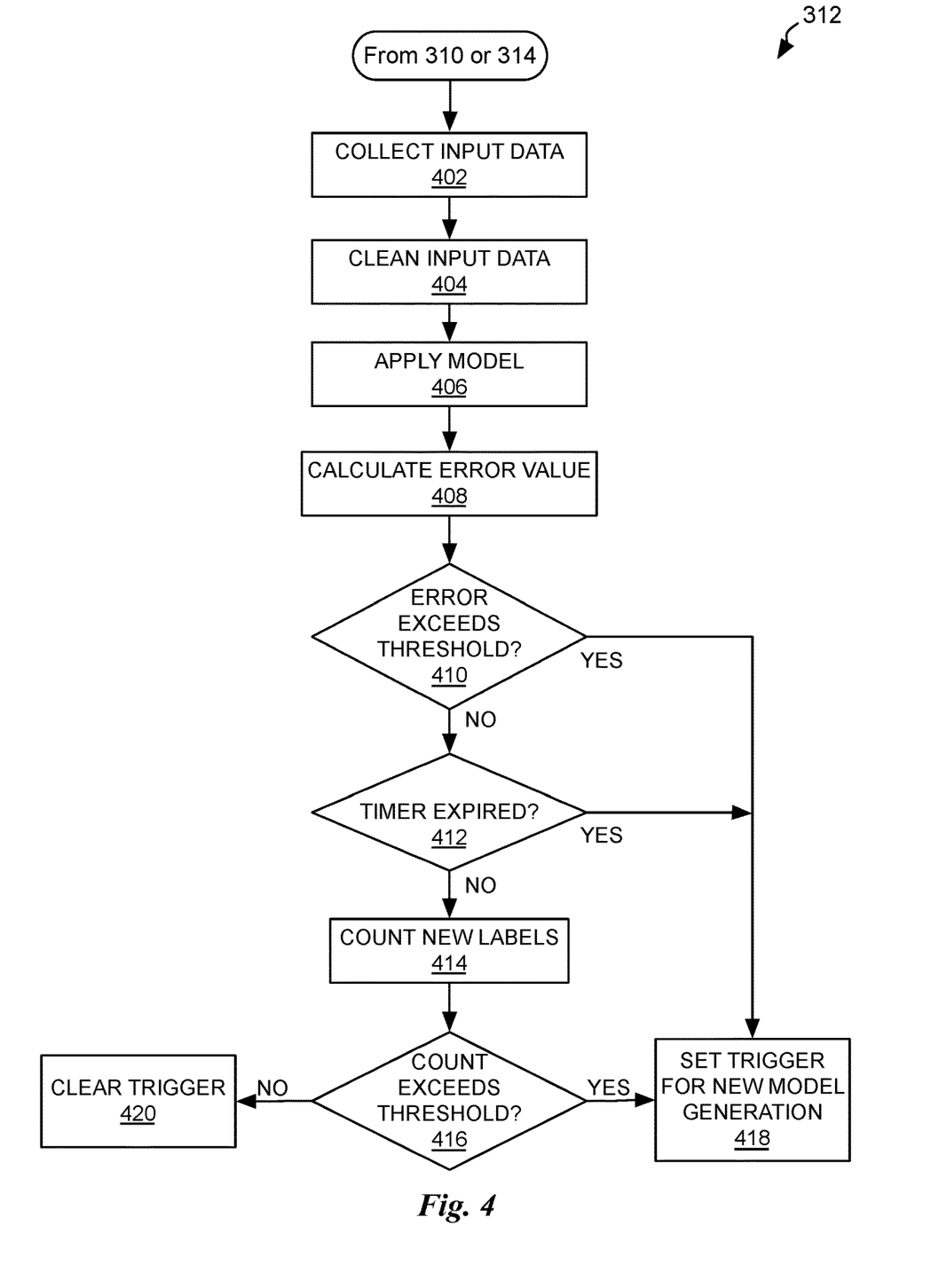
FIG. 4 illustrates an operation shown in FIG. 3, in accordance with one embodiment.

FIG. 4 illustrates the operation 312 shown in FIG. 3, in accordance with one embodiment. In operation 402, input data is collected. In operation 404, the input data is cleaned. In one embodiment, cleaning comprises removal of corrupted, incorrect, and irrelevant data. In operation 406, the model 140 is applied to process the cleaned input data and generate results. When labels corresponding to the input data are available, the results may be compared with the labels to identify errors. In one embodiment, the labels corresponding to the input data are received after the input data is processed. In one embodiment, features are engineered for the input data and the input data is prepared. The prepared input data and features are then stored in the data samples storage 115 for use as training data when the labels associated with the input data are available.

In operation 408, the review engine 120 calculates an error value for processing the input data. In the context of the following description, the error value may be an error rate or may be a count of the number of errors that have been detected since the model 140 was trained or a new model 140 was generated. In one embodiment, errors for results produced by the model 140 are detected by the model generator/trainer 135 and error data is provided to the review engine 120 by the model generator/trainer 135. In operation 410, the review engine 120 determines if the error value exceeds a predetermined threshold error value. If the predetermined threshold error value is exceeded, then the review engine 120 proceeds to operation 418 and sets a trigger for generating a new model 140.

Otherwise, if the predetermined threshold error value is not exceeded in operation 410, then the review engine 120 proceeds to operation 412 to determine if a timer has expired. In one embodiment, the timer is reset each time the model 140 (or a new model 140) is trained and indicates the amount of time elapsed since the model 140 was trained. If, at operation 412, the timer has expired, then the review engine 120 proceeds to operation 418 and sets a trigger for generating a new model 140. Otherwise, if the timer has not expired in operation 412, then the review engine 120 proceeds to operation 414 to calculate a count of new labels that have been received. The new labels may be received by the review-based learning system 100 with new raw data or separately.

In operation 416, the review engine 120 determines if the count of new labels exceeds a predetermined threshold count value. If the predetermined threshold count value is exceeded, then the review engine 120 proceeds to operation 418 and sets a trigger for generating a new model 140. Otherwise, if the predetermined threshold count value is not exceeded in operation 416, then the review engine 120 proceeds to operation 420 and clears the trigger. In one embodiment, instead of clearing the trigger, the review engine 120 simply proceeds to operation 314 shown in FIG. 3. After completing operation 418 or 420, the review engine 120 proceeds to operation 314 shown in FIG. 3.

Figure 5:
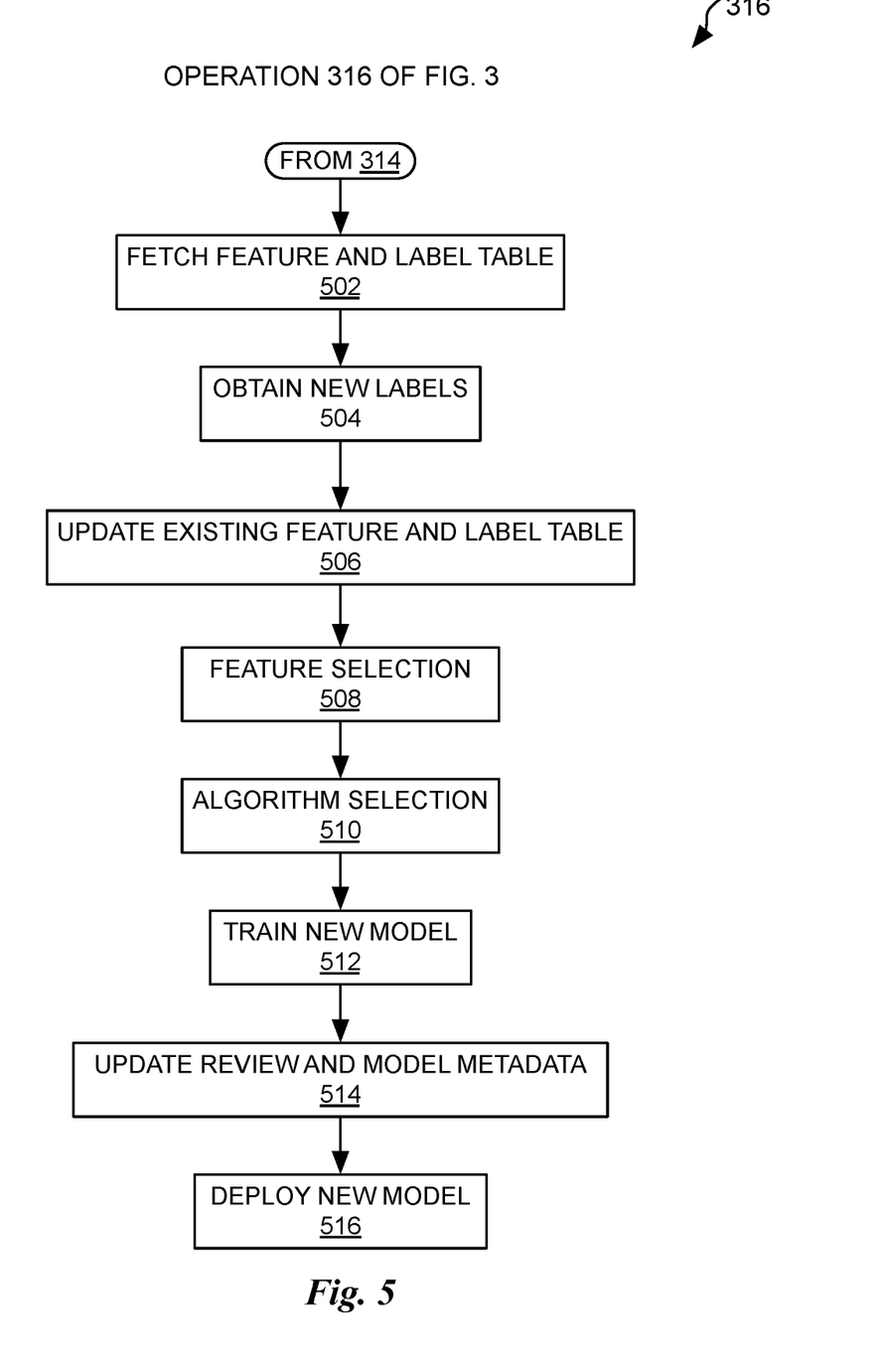
FIG. 5 illustrates another operation shown in FIG. 3, in accordance with one embodiment.

FIG. 5 illustrates the operation 316 shown in FIG. 3, in accordance with one embodiment. As previously described, operation 316 the model generator/trainer 135 trains the new model 140 is using existing selected features stored in the feature and label table 250 and existing prepared data stored in the data samples storage 115. In operation 502, the feature and label table 250 is fetched by the review engine 120. In operation 504, the review engine 120 obtains the new labels. In operation 506, the review engine 120 updates the existing feature and label table 150 to incorporate any new labels. In operation 508, the feature selection unit 130 performs feature selection using the existing features. One or more of the functions corresponding to the existing and/or new labels may be replaced or modified during the model generation process.

In operation 510, the model generator/trainer 135 selects an algorithm for the new model 140. The algorithm may be the same as was used for the existing model 140 or the algorithm may be changed. In operation 512, the model generator/trainer 135 trains the new model 140. In operation 514, the review engine 120 updates review metadata and model metadata. The review metadata and model metadata are described in conjunction with FIG. 6. In one embodiment, the review engine 120 saves a record of each model 140 that is trained as model metadata. In one embodiment, the review engine 120 saves a record of the generation process for each model 140 as review metadata. The review metadata and model metadata preserves the record of each model 140 and the generation of the model 140. In operation 516, the new model 140 is deployed by replacing the existing model 140 with the new model 140.

Figure 6:
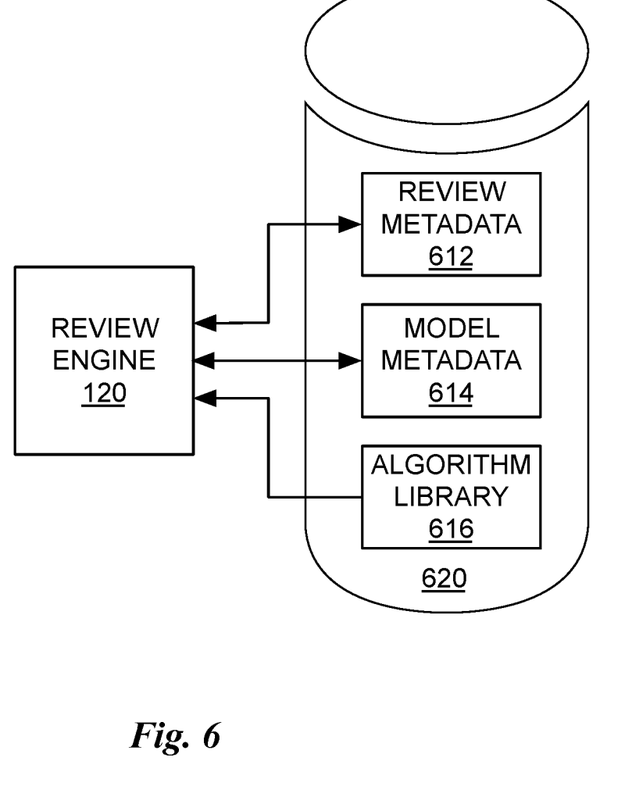
FIG. 6 illustrates the review engine shown in FIG. 1, in accordance with one embodiment.

FIG. 6 illustrates the review engine 120 shown in FIG. 1, in accordance with one embodiment. The review engine 120 maintains review metadata 612, model metadata 614, and an algorithm library 616. The review metadata 612, model metadata 614, and an algorithm library 616 may be stored by the review engine 120 in the features & labels storage 125, the data samples storage 115, or in a dedicated storage means in the form of storage 620.

The algorithm library 616 is provided to the model generator/trainer 135 during generation of the model 140 to determine an algorithm for the model 140. The review engine 120 maintains a record of the different models 140 that are generated by the model generator/trainer 135. In one embodiment, the model metadata 614 is an abstract representation of each model 140 that includes a name (i.e., unique identifier), the selected features (e.g., name and type, such as integer, float, binary, categorical, etc.), the algorithm, the labels, weights associated with features, and other properties. The review engine 120 may use the model metadata 614 to ensure that a particular model 140 is not repeated or to use a particular model 140 based on one or more of the new labels, new selected features, or new prepared data. The review engine 120 also maintains review metadata 612. In one embodiment, the review metadata 612 includes the accuracy of the model 140, training dataset (corresponds to a particular feature & label table 250) the trigger event for each new model generation, label (particular column of the feature & label table 250), time stamp of collected raw data (which is also the time stamp of the features), time stamp of the labels, name of the generated model 140, and other properties.

The review-based learning system 100 relies on initially training a model 140 with a large quantity of data, features engineered based on the large quantity of data, and labels corresponding to the large quantity of data. A new model 140 is then generated in response to a trigger. Generation of the new model 140 is accomplished using the existing features and new labels that are associated with new data or with existing data. In contrast with conventional techniques, new features based on the new data are not necessarily used to train the new model 140. As part of the model generation process, the review-based learning system 100 may modify the algorithm used by the model 140, employ one or more new labels, and/or modify one of more of the functions associated with the existing labels. Because training the new model 140 does not rely on preparing new raw data and engineering new features, the training can be completed in less time and using less computational resources compared with conventional techniques. The model 140 benefits from the use of the existing prepared data, existing selected features, and a combination of existing and new labels to maintain a high level of accuracy.

Figure 7:
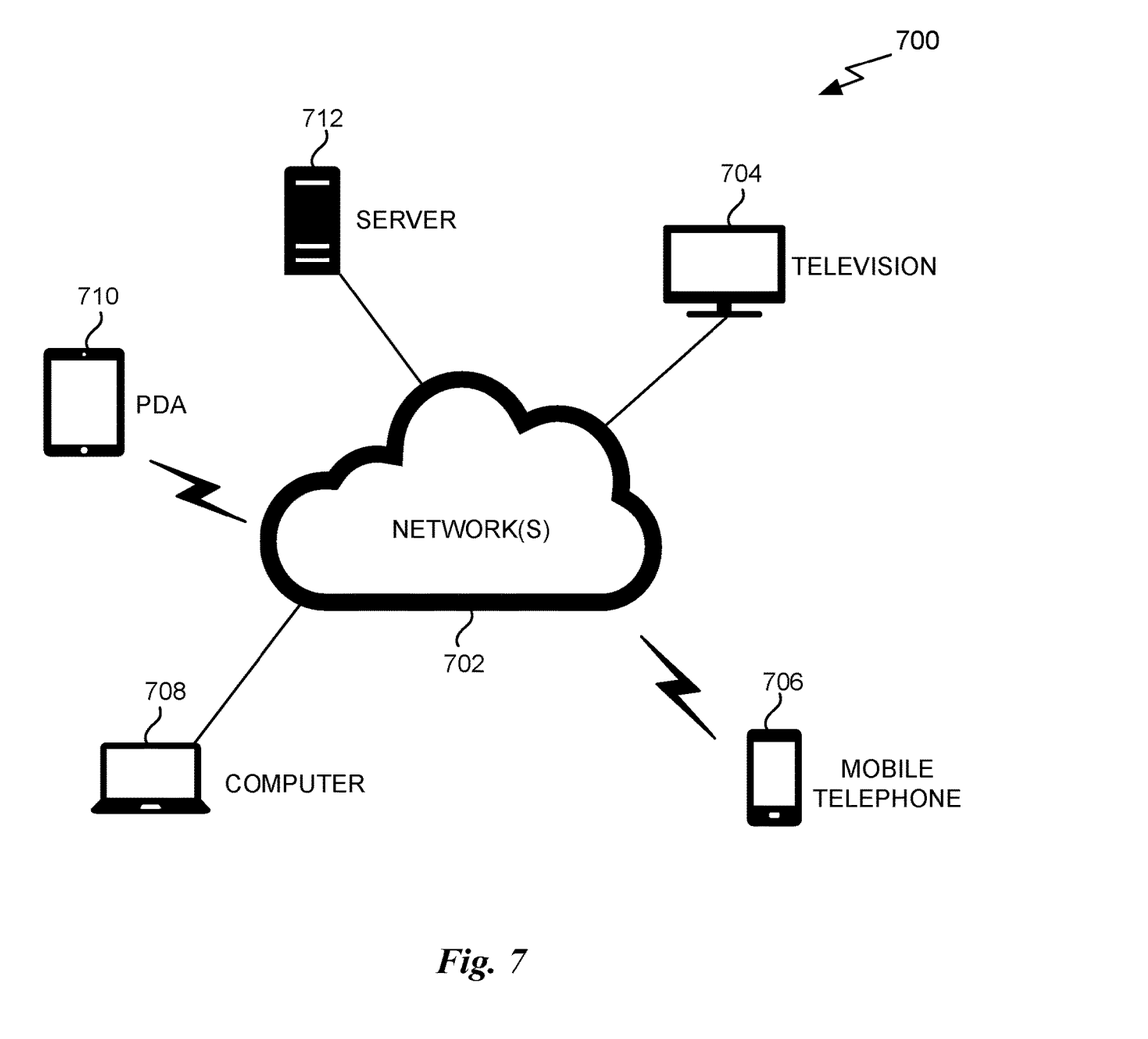
FIG. 7 illustrates a network architecture, in accordance with one embodiment.

FIG. 7 is a diagram of a network architecture 700, in accordance with an embodiment. As shown, at least one network 702 is provided. In various embodiments, any one or more components/features set forth during the description of any previous figure(s) may be implemented in connection with any one or more components 704-712 coupled to the at least one network 702. For example, in various embodiments, any of the components 704-712 may be equipped with the review-based learning system 100 of FIG. 1, for implementing cognitive learning applications.

In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server 712 and a computer 708 may be coupled to the network 702 for communication purposes. Such computer 708 may include a desktop computer, laptop computer, and/or any other type of logic. Still yet, various other devices may be coupled to the network 702 including a personal digital assistant (PDA) device 710, a mobile phone device 706, a television 704, etc.

Figure 8:
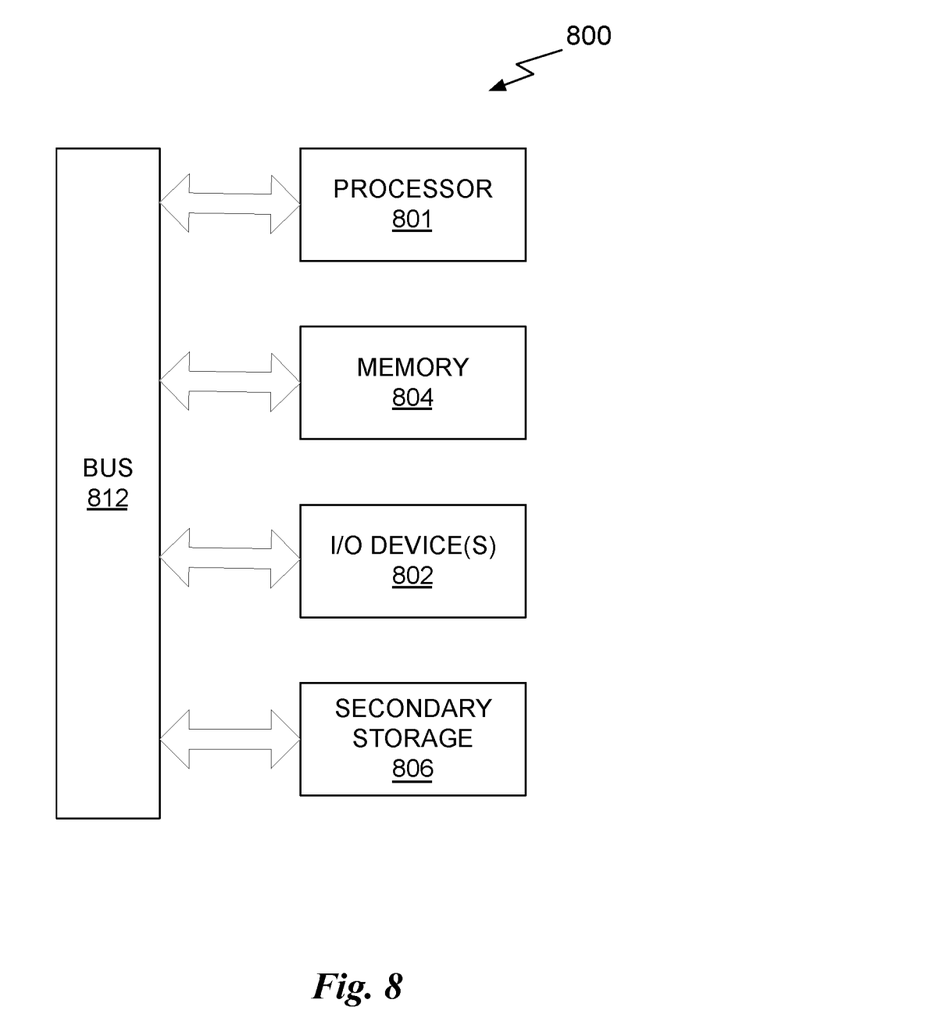
FIG. 8 illustrates an exemplary processing system, in accordance with one embodiment.

FIG. 8 illustrates an exemplary processing system 800, in accordance with one embodiment. As shown, a processing system 800 is provided including a plurality of devices that are connected to a communication bus 812. The devices include a processor 801, a memory 804, input/output (I/O) device(s) 802, and a secondary storage 806. The communication bus 812 may be implemented using any suitable protocol. One or more of the processor 801, memory 804, and a secondary storage 806 may be configured to implement the review-based learning system 100.

The processing system 800 also includes the memory 804 (e.g. random access memory (RAM), etc.). The processing system 800 may also include the secondary storage 806. The secondary storage 706 includes, for example, a hard disk drive and/or a removable storage drive, a floppy disk drive, a magnetic tape drive, a compact disk drive, etc. The removable storage drive reads from and/or writes to a removable storage unit in a well-known manner. The processing system 800 may also include the I/O device(s) 802. Output devices may include a conventional CRT (cathode ray tube), LCD (liquid crystal display), LED (light emitting diode), plasma display or the like. User input may be received from the I/O device(s) 802, e.g., keyboard, mouse, touchpad, microphone, gaze tracking, and the like.

Computer programs, or computer control logic algorithms, may be stored in the memory 804, the secondary storage 806, and/or any other memory, for that matter. Such computer programs, when executed, enable the processing system 800 to perform various functions (as set forth above including, but not limited to those of review-based learning, for example). Memory 804, secondary storage 806 and/or any other storage are possible examples of tangible computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, or electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

Computer-readable non-transitory media includes all types of computer readable media, including magnetic storage media, optical storage media, and solid state storage media and specifically excludes signals. It should be understood that the software can be installed in and sold with the devices described herein. Alternatively the software can be obtained and loaded into the devices, including obtaining the software via a disc medium or from any manner of network or distribution system, including, for example, from a server owned by the software creator or from a server not owned but used by the software creator. The software can be stored on a server for distribution over the Internet, for example.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A processing device, comprising:
a non-transitory memory storing instructions; and
one or more processors in communication with the non-transitory memory, wherein the one or more processors execute the instructions to:
receive first data;
generate first features based on the first data;
identify a first set of labels for the first data;
train a first machine learning model, using the first features and the first set of labels;
determine whether a trigger has occurred; and
review the first machine learning model to generate a second machine learning model in response to determining that the trigger has occurred, the determining whether a trigger has occurred including determining whether a count of the labels in the second set of labels has exceeded a threshold, the reviewing comprising:
receiving a second set of labels for the first data, and
training the second machine learning model using the second set of labels and reusing the first features generated based on the first data.

2. The processing device of claim 1, wherein the first data is received during a first time period, and second data is received during a second time period after the first time period.

3. The processing device of claim 1, wherein the determination whether the trigger has occurred includes determining whether a timer has expired.

4. The processing device of claim 1, wherein the determination whether the trigger has occurred includes determining whether an error value in connection with a performance of the first machine learning model has exceeded a threshold.

5. The processing device of claim 1, wherein a generation of second features based on the second set of labels is avoided by reusing at least a portion of the first features in connection with the generation of the second machine learning model.

6. The processing device of claim 1, wherein the second machine learning model is generated utilizing second features different from the first features generated based on the second set of labels in addition to at least a portion of the first features.

7. The processing device of claim 1, wherein the second set of labels replaces the first set of labels.

8. The processing device of claim 1, wherein the one or more processors execute the instructions to maintain model metadata by recording properties for the first machine learning model and the second machine learning model, the properties including a name, a portion of the first features selected for training, an algorithm, or a set of labels.

9. The processing device of claim 1, wherein the one or more processors execute the instructions to maintain review metadata by recording properties for the first machine learning model and the second machine learning model, the properties including at least one of accuracy, a trigger event for each new machine learning model generation, a label, a time stamp, or a model name.

10. The processing device of claim 1, wherein the one or more processors execute the instructions to store a feature and label table in a memory, the feature and label table including the first features and the first set of labels for the first data.

11. The processing device of claim 10, wherein the one or more processors execute the instructions to update the feature and the label table in the memory to include the second set of labels for the first data.

12. The processing device of claim 1, wherein a first portion of the first features is used to train the first machine learning model and a second portion of the first features that comprises a subset of the first portion is used to train the second machine learning model.

13. The processing device of claim 1, wherein a first portion of the first features is used to train the first machine learning model and the first portion of the first features is used to train the second machine learning model.

14. A computer-implemented method comprising:
receiving first data;
generating first features based on the first data;
identifying a first set of labels for the first data;
training a first machine learning model, using the first features and the first set of labels;
determining whether a trigger has occurred; and
reviewing the first machine learning model to generate a second machine learning model in response to determining that the trigger has occurred, the determining whether a trigger occurred including determining whether a count of the labels in the second set of labels has exceeded a threshold, the reviewing comprising:
receiving a second set of labels for the first data, and
training the second machine learning model using the second set of labels and reusing the first features generated based on the first data.

15. The method of claim 14, wherein a generation of second features based on the second set of labels is avoided by reusing at least a portion of the first features in connection with the generation of the second machine learning model.

16. The method of claim 14, further comprising:
determining whether a trigger has occurred; and
generating the second machine learning model in response to determining that the trigger has occurred.

17. The method of claim 14, wherein the second set of labels replaces the first set of labels.

18. A non-transitory computer-readable media storing computer instructions, that when executed by one or more processors, cause the one or more processors to perform the steps of:
receiving first data;
generating first features based on the first data;
identifying a first set of labels for the first data;
training a first machine learning model, using the first features and the first set of labels;
determining whether a trigger has occurred; and
reviewing the first machine learning model to generate a second machine learning model in response to determining that the trigger has occurred, the determining whether a trigger occurred including determining whether a count of the labels in the second set of labels has exceeded a threshold, the reviewing comprising:
receiving a second set of labels for the first data, and
training the second machine learning model using the second set of labels and reusing the first features generated based on the first data.

* * * * *